Figure 1:
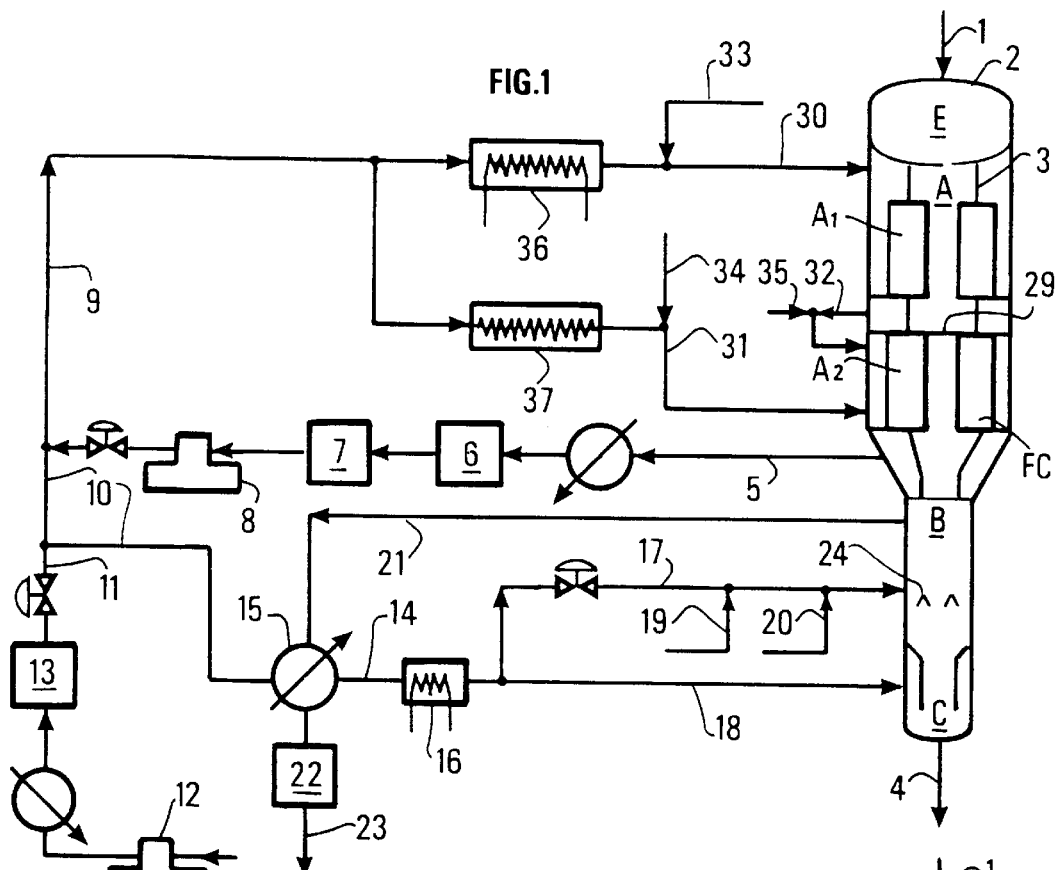

United States Patent
Capelle et al.

[11] Patent Number: 6,048,814
[45] Date of Patent: Apr. 11, 2000

[54] PROCESS AND UNIT FOR REGENERATION OF A CATALYST FOR THE PRODUCTION OF AROMATIC COMPOUNDS OR FOR REFORMING

[75] Inventors: Marianne Capelle, Ternay; Jean-Marie Deves, Vernouillet; Frédéric Hoffmann, Paris; Michel Thery; François-Xavier Brunet, both of Vernaison; Emmanuelle Bromet, Rueil-Malmaison, all of France

[73] Assignee: Institut Francais du Petrole, Rueil Malmaison Cedex, France

[21] Appl. No.: 09/059,294

[22] Filed: Apr. 14, 1998

[30] Foreign Application Priority Data

Apr. 14, 1997 [FR] France .................... 97 04660

[51] Int. Cl.[7] .............. B01J 38/00; B01J 38/44
[52] U.S. Cl. .............. 502/37; 502/38; 502/43; 502/45; 502/46
[58] Field of Search .............. 502/37, 38, 43, 502/45, 46, 47, 48, 49, 52

[56] References Cited

U.S. PATENT DOCUMENTS

| | | | |
|---|---|---|---|
| 4,849,092 | 7/1989 | Ham et al. | 502/37 |
| 4,872,970 | 10/1989 | Boyle | 208/140 |
| 5,053,371 | 10/1991 | Williamson | 502/37 |

FOREIGN PATENT DOCUMENTS

| | | |
|---|---|---|
| 0 258 137 | 3/1988 | European Pat. Off. . |
| 0 378 482 | 7/1990 | European Pat. Off. . |
| 2 642 330 | 8/1990 | France . |
| 2228426 | 8/1990 | United Kingdom . |

*Primary Examiner*—Steven Bos
*Attorney, Agent, or Firm*—Millen, White, Zelano & Branigan, P.C.

[57] ABSTRACT

The invention concerns a process and unit for regenerating a catalyst for the production of aromatic compounds, in particular for reforming, the catalyst being in a moving bed, comprising combustion, oxychlorination and calcining steps, in which at least one chlorinating agent, at least one oxygen-containing gas, and water are introduced into the oxychlorination step such that the $H_2O/HCl$ molar ratio is 1 to 50, the oxychlorination step being carried out in the presence of an oxychlorination gas containing less than 21% of oxygen and at least 50 ppm by weight of chlorine (based on HCl), and at a temperature of 350–600° C., and in which the combustion step is carried out in at least two combustion zones, each zone being separated from the adjacent zones, and at least one gas charged with oxygen is introduced into each zone, the gases produced being extracted from each zone, and in which the severity of the operating conditions increases in the direction of flow of the catalyst.

24 Claims, 1 Drawing Sheet

PROCESS AND UNIT FOR REGENERATION OF A CATALYST FOR THE PRODUCTION OF AROMATIC COMPOUNDS OR FOR REFORMING

FIELD OF THE INVENTION

The invention relates to moving bed processes for the production of aromatic compounds, in particular for reforming. More particularly, it concerns the regeneration of a used catalyst and is intended to restore its initial catalytic performances.

BACKGROUND OF THE INVENTION

The catalyst generally comprises a support (for example, formed from at least one refractory oxide, the support possibly also including one or more zeolites), at least one noble metal (preferably platinum), and preferably at least one promoter metal (for example tin or rhenium), at least one halogen and optionally one or more additional elements (such as alkalis, alkaline-earths, lanthanides, silicon, group IVB elements, non noble metals, group IIIA elements, etc.). Catalysts of this type contain platinum, for example, and at least one other metal deposited on a chlorinated alumina support. In general, such catalysts are used to convert naphthenic or paraffinic hydrocarbons, which can be transformed by dehydrocyclisation and/or dehydrogenation, for reforming or for the production of aromatic compounds (for example for the production of benzene, toluene, ortho-meta- or para-xylenes). Such hydrocarbons originate from fractionation of crude oil by distillation or other transformation processes.

Such catalysts have been widely described in the literature.

One way of increasing the yields of such reforming or aromatic compound production processes is to reduce the operating pressures at which the different reactions of importance are carried out. As an example, reforming reactions were carried out at 40 bars 30 years ago; 20 years ago, at 15 bars. Today, reforming reactors usually operate at pressures of less than 10 bars, in particular in the range 3 to 8 bars.

The improvement in desirable reactions due to a reduction in pressure is accompanied by more rapid deactivation of the catalyst by coking. Coke, a high molecular weight compound constituted essentially by carbon and hydrogen, is deposited on the active sites of the catalyst. The H/C molar ratio of the coke formed varies from about 0.3 to 1.0. The carbon and hydrogen atoms form condensed poly-aromatic structures with a variable degree of crystalline organisation, depending on the function and nature of the catalyst and the operating conditions of the reactors. While the selectivity of transformation of the hydrocarbons to coke is very low, the amounts of coke accumulated on the catalyst can be large. Typically, for fixed bed units, such amounts are in the range 2.0% to 20.0% to 25.5% by weight. For circulating bed units, such amounts are below 10.0% by weight.

Coke deposition, which is more rapid at low pressure, also requires more rapid regeneration of the catalyst. Current regeneration cycles have become as short as 2–3 days.

Our European patent EP-A-0 378 482 discloses a continuous process for regenerating a reforming or aromatic compound production catalyst which can overcome the inherent disadvantages of shorter and shorter cycles. One of the regeneration steps is oxychlorination of the catalyst. The present invention concerns this step.

In EP-A-0 378 482, the used catalyst slowly travels from top to bottom in a regeneration vessel where it meets, in succession, a first radial moving bed combustion zone, a second radial moving bed combustion zone, an axial moving bed oxychlorination zone and an axial moving bed calcining zone, and:

a) in the first combustion zone, the catalyst is treated at a pressure of 3 to 8 bars, substantially equal to that in the first reforming reactor, at a temperature in the range 350° C. to 450° C., using a combustion gas based on an inert gas circulating as a co-current to the catalyst, comprising 0.01% to 1% of oxygen by volume, the combustion gas originating from a zone for washing the gases from the combustion, oxychlorination and calcining steps;

b) in a second combustion zone, the catalyst is treated at a pressure of 3 to 8 bars, substantially equal to that in the first reactor, at a temperature which is higher by at least 20° C. than the temperature in the first combustion zone, in the presence of gases originating from the first combustion zone and in the presence of an inert makeup gas to which up to 20% by volume of oxygen is added so that the catalyst is in contact with a gas comprising 0.01% to 1% by volume of oxygen, the gases circulating as a co-current with the catalyst;

c) the burn gases are evacuated from the second combustion zone and sent to a washing circuit after first being mixed with the gases extracted from the oxychlorination zone and the calcining zone;

d) in the axial oxychlorination zone, the catalyst is treated with a co-current of a mixture of a gas originating from the calcining zone and the chlorinated gas for 30 min to 60 min, the mixture forming an oxychlorination gas comprising 4% to 10% by volume of oxygen, at a pressure of 3 to 8 bars; the water content is of the order of 500–7000 ppm, with no added water, it originates from the gas from the combustion step, which has been washed and dried and used in part for oxychlorination, but also essentially for calcining;

e) in the axial calcining zone, the catalyst is treated for 45 min to 80 min in a counter-current at between 350° C. and 550° C. at a pressure in the range 3 to 8 bars, using a portion of the gas originating from the washing circuit and a drying zone, the gas not containing more than 100 ppm of water.

SUMMARY OF THE INVENTION

The inventors have established that controlling the operating conditions of the process could improve it and gas management which could precisely control the operating conditions of the combustion step and also the calcining step has been studied.

The process and unit of the invention satisfy these objectives.

More precisely, the process of the invention is a process for regenerating a moving bed of catalyst for reforming or for aromatic hydrocarbon production, the catalyst comprising a support, at least one noble metal and at least one halogen, the process comprising a combustion step treating the catalyst in a moving bed in at least two successive combustion zones, an oxychlorination step and a calcining step, in which each combustion zone is separated from the adjacent combustion zones so as to allow catalyst to pass and to prevent the passage of gases;

at least one oxygen-containing gas is introduced into each zone of the combustion step, and the gases produced are extracted from each zone;

the severity of the operating conditions in each zone of the combustion step increases in the direction of flow of the catalyst;

at least one chlorinating agent, at least one oxygen-containing gas and water are introduced into the oxychlorination step, such that the H$_2$O/HCl molar ratio is 1 to 50, the oxychlorination step being carried out in the presence of an oxychlorination gas containing less than 21% of oxygen and at least 50 ppm by weight of chlorine (based on HCl), at a temperature of 350–600° C.

The process is carried out in a moving bed or with intermittent flow of the catalyst (in this case, each step is carried out in a different zone, the catalyst flowing from one zone to the other).

Regeneration starts with a step for combustion of the carbonized material. It is followed by an oxychlorination step then by a calcining step.

In general, the gases from combustion and the gases from the oxychlorination step are separately extracted from the regeneration process, in general. In order to prevent the gases from mixing, a plate or other means is advantageously positioned so as to separate the combustion and oxychlorination zones in moving bed processes. In contrast, in these moving bed processes, gases from the calcining step can generally pass freely into the oxychlorination zone.

Regarding the combustion step, it is carried out in at least two consecutive adjacent and separated zones, i.e., the catalyst leaving one combustion zone passes directly into the next combustion zone, with no treatment between the two zones, at least a portion, preferably all, of the gas extracted from one combustion zone being sent to the next zone (in the direction of catalyst flow) with possible oxygen addition (air, for example).

In general, the operating conditions are rendered more severe by increasing the temperature and/or the oxygen content of the incoming gas. Preferably, for each zone the oxygen content in the incoming gas is in the range 0.01% to 2%, preferably 0.5% to 1.5% and generally more than 0.5%, the temperature of the inlet gas is in the range 350–600° C., preferably 400–600° C., the residence time of the catalyst in one zone is in the range 5 min to 3 hours and the WHSV (hourly mass flow rate of gas/mass of catalyst in contact with the gas) is in the range 1–50 h$^{-1}$.

The combustion step advantageously ends with a final zone for controlling and monitoring the end of combustion in which the oxygen consumption is less than 10% of the oxygen entering that zone. The temperature is preferably substantially constant. The monitoring and control zone is preferably located in the lower portion of the last combustion zone, thus after the flame front.

Further, a gas containing oxygen in an amount which is higher than that of the gas entering the upstream (in the direction of flow of the catalyst) levels is generally introduced into the control and monitoring zone.

Thus the present invention defines combustion in a plurality of zones (or stages), where each stage is characterized by a temperature in that stage, a temperature of the incoming oxygen-containing gas, an oxygen content of the incoming gas, a gas flow rate and a duration of exposure of the coked catalyst to these conditions, in order to obtain more efficient combustion.

The catalyst which has undergone the combustion step is ready to undergo an oxychlorination step. It is carried out in one or more zones, of axial or radial type. At least one chlorinating agent, at least one oxygen-containing gas and water are introduced into the oxychlorination zone. The chlorinating agent can be chlorine, HCl, or a halogenated hydrocarbon containing less than 4 carbon atoms and 1 to 6 chlorine atoms (for example CCl$_4$) or any chlorinating agent which is known to liberate chlorine in these regeneration processes. It is preferably introduced with the oxygen-containing gas. It is advantageously introduced into the lower portion of the oxychlorination zone so that it flows as a counter-current to the catalyst, when the oxychlorination zone is axial.

The quantity of chlorinating agent introduced is such that the chlorine concentration (based on HCl) in the gas in contact with the catalyst in the oxychlorination zone, termed the oxychlorination gas (i.e., for moving bed processes, the gas introduced into the oxychlorination zone+the gas originating from the calcining zone), is at least 50 ppm by weight, in general 50–8000 ppm by weight, advantageously more than 650 ppm by weight, and preferably in the range 1000 to 8000 ppm by weight. For technical reasons (linked to corrosion, for example, or to the subsequent treatment of the chlorinated gases), it is also preferable to operate with contents which do not exceed 4000 or 5000 ppm by weight.

At least one oxygen-containing gas is also introduced into the oxychlorination zone. This gas advantageously contains a portion of the gases from the combustion step, preferably washed and dried, with additional makeup oxygen, for example air. In moving bed processes with an axial oxychlorination zone, this gas preferably circulates as a counter-current to the catalyst.

In the oxychlorination zone, the catalyst is in contact with the gas introduced and also in contact with gas originating from the calcining zone, charged again with oxygen and containing a little water from the calcining step. The oxygen content of the oxychlorination gas is below 21% (by volume). It is generally above 10% by volume.

It can be seen that in the invention, in a preferred moving bed process, and in contrast to the prior art EP-A-0 378 48, at least one oxygen-containing gas is introduced into the oxychlorination step (the axial oxychlorination zone, for example), independently of the oxygen-containing gas introduced into the calcining step (the axial calcining zone, for example).

Without departing from the scope of the invention, it is also possible to introduced into the oxychlorination step only chlorinating agent and water, in which case good distribution of chlorine and water is more difficult to achieve, the oxygen-containing gas then originating only from the calcining zone.

In a novel advance over EP-A-0 378 482, water is introduced into the oxychlorination step. It is advantageously supplied as a mixture with the oxygen-containing gas introduced.

The quantity of water introduced is in an H$_2$O/HCl molar ratio of 1 to 50, the ratio generally being at least 3, preferably 4 to 50, or 4 to 30, advantageously 7 to 50, and more preferably 7 to 30. Water is supplied in liquid form or, as is preferable, as steam.

The oxychlorination gas is thus highly charged with water, and its water content is over 7000 ppm, generally at least 8000 ppm or even 10000 ppm by weight, preferably over 10000 ppm by weight.

The noble metal is re-dispersed in the presence of oxygen, chlorine and water under the described conditions, and at temperatures of 350–600° C., preferably 350–550° C. in the oxychlorination step, but usually at least 450° C., preferably between 490° C. and 530° C. The residence time of the catalyst in the oxychlorination step is normally less than 2 hours and is generally between 45 min and 2 hours.

The pressure in this zone must be balanced with the pressures in the adjacent zones when the catalyst is circulated, and at 3–8 bars for moving bed processes for catalyst regeneration operating in low pressure reforming processes.

In moving bed processes, the oxychlorination gas also contains gas originating from the calcining zone; an oxygen-containing gas is introduced into this calcining zone, also less than 1 mole % of water, preferably less than 0.1% of water and more preferably less than 0.05% of water. In general, the water content will be below 150 ppm molar, preferably less than 100 ppm molar and advantageously less than 50 ppm molar.

The oxygen-containing gas can be air. Advantageously, this gas comprises a portion of the gas from the combustion step, which has been washed and dried, with an addition of oxygen (air). In this advantageous case, the oxygen content in the gas introduced into the calcining step is less than 21% by volume. In general, the oxygen content of the gas introduced into the calcining step is at most 21% by volume.

As is known, the temperature of the calcining step is in the range 350° C. to 600° C., preferably 350–550° C. The oxygen-containing gas circulates as a counter-current to the catalyst in moving bed processes with an axial calcining zone. In general, the residence time is less than 1 hour.

In order to strictly control the operating conditions in the oxychlorination zone, it is preferable to operate without recycling the oxychlorination gases.

The absence of recycling also enables the oxygen content to be more precisely controlled, and means that high oxygen contents (no dilution) can economically be obtained.

However, some implementations may include recycling.

In the absence of recycling (preferred case), the oxychlorination gas (or the purge of this gas if it is recycled) leaving the oxychlorination gas is discharged from the unit (for example into the atmosphere) after treatment to eliminate at least the chlorinated impurities.

It is also important to dry the gas supplied to the oxychlorination zone from the combustion step, when this is the case, to control the quantity of water present in the oxychlorination gas using the quantity of water added. The gas extracted from the combustion step can be dried before it is fractionated to supply a portion to the oxychlorination zone, or the fractionated portion can be dried. The air is also preferably dried.

Under the conditions of the process of the invention, a considerable improvement in re-dispersion of the metallic phase of the catalyst is obtained with respect to the prior art.

The state of dispersion of the metallic phase of the catalyst is quantitatively determined by $H_2/O_2$ chemisorption.

The process will be better understood from the description of FIG. 1 which shows the unit of the invention.

The invention also provides an unit for regenerating a reforming or aromatic compound production catalyst comprising a support, at least one noble metal and at least one halogen, comprising at least one inlet conduit (1) and an outlet conduit (4) for the catalyst to leave the vessel, said catalyst successively traversing combustion, oxychlorination and calcining zones in a moving bed, said vessel comprising:

- at least two radial combustion zones (A1, A2) disposed in series, and between the combustion zones are disposed separating means allowing passage of catalyst between said zones in the conduits but preventing passage of gas between said zones;
- a zone (FC) for monitoring and controlling combustion completion located in the lower portion of the last combustion zone;
- at least one conduit (30) for introducing oxygen-containing gas into the first combustion zone, at least one conduit (32) for evacuating gases from one combustion zone and introducing them into the following combustion zone, and at least one conduit (31) for introducing oxygen-containing gas into the control and monitoring zone;
- at least one conduit (5) for evacuating gas from the combustion step outside the vessel, said conduit being located upstream of the oxychlorination zone, and the vessel comprising at least one means for cooling the gases, at least one means for treating said gases to eliminate impurities, at least one means for drying the gases, and at least one means for compressing the gases;
- at least one conduit (9) for evacuating a portion of the compressed gases from the combustion step connected to conduits (30) and (31);
- at least one conduit (10) for evacuating the other portion of the compressed gases from the combustion; at least one means (16) for heating gases being located in this conduit, and said conduit is connected to at least one conduit (17) which supplies at least a portion of said gases to the oxychlorination zone, said conduit (17) being connected to at least one conduit (20) for introducing water and to at least one conduit (19) for introducing a chlorinating agent;
- at least one conduit (18) for introducing an oxygen-containing gas into the calcining zone;
- at least one conduit (21) for evacuating gas from the oxychlorination zone, comprising at least one means (22) for treating said gases before their evacuation from the unit.

Advantageously, conduit (9) comprises at least one means for heating the gas supplied to the monitoring and controlling zone.

Advantageously, at least one gas heating means (36, 37) is located in each conduit (30) and (31).

Advantageously, conduit (5) comprises at least one cooling means, followed by at least one drier, then at least one compression means.

Global management of the gases in the vessel itself enables optimised combined operation of the combustion, oxychlorination and calcining zones to be carried out.

Thus the gases from the combustion step are cooled, treated to eliminate impurities, dried, compressed then fractionated into two streams; after adding oxygen and possible re-heating, the first stream is sent to the first combustion zone, and after adding oxygen, water and chlorinating agent, and after heating, the second stream is sent to the oxychlorination step, and the gases from the oxychlorination step are treated and evacuated from the unit.

In FIG. 1 containing two combustion zones, the zones are separate so as to allow the catalyst to pass and to prevent the passage of gas, the second combustion zone comprising in its lower portion a zone for monitoring and controlling combustion completion, and all of the gas extracted from the first combustion zone is sent to the second combustion zone after adding oxygen, the gas from the second combustion zone is cooled, treated to eliminate impurities, purged, dried, compressed then separated into two streams; after adding oxygen, the first stream is introduced into the first combustion zone and after optional re-heating, into the monitoring and control zone; the second stream is added to a re-heated dry oxygen-containing gas and sent to the oxychlorination zone after adding water and a chlorinating agent.

In one implementation, the first stream is separated into two fractions, one being introduced into the first combustion zone after adding oxygen, and the other being introduced into the monitoring and control zone after adding oxygen and re-heating.

In a further implementation, the first stream is separated into two fractions, each having oxygen added and being re-heated before introducing one fraction into the first combustion zone and the other into the monitoring and control zone.

Still further, in one implementation, the second re-heated stream is separated into two fractions, one being sent to an oxychlorination zone after adding water and chlorinating agent, the other being sent to the calcining zone.

In a further implementation, the two fractions from the first stream or only the fraction which is introduced into the monitoring and control zone can be re-heated.

In conventional fashion, the used catalyst to be regenerated is introduced into the top (2) of regeneration vessel E via conduit (1).

The catalyst is then introduced into a first combustion zone A1 via conduits or shafts (3). In this zone, the catalyst undergoes a first burn or combustion using an oxygen-containing gas introduced via conduit (30).

The combustion zones are generally radial, preferably annular, and the bed thus flows in an annular space delimited by two coaxial cylindrical walls, the gas entering via one wall and leaving via the other.

After passage through this first combustion zone, the gas is extracted from the zone via conduit (32), and at least a portion, preferably all, is re-introduced into the second combustion zone A2, in which the catalyst is flowing.

In general at least a portion, preferably all, of the gas extracted from one combustion zone is re-introduced into the next zone.

If required, makeup oxygen is added via conduit (35). This arrangement enables the remaining oxygen to be used to a maximum with minimum oxygen addition.

In accordance with the invention, combustion zones A1 and A2 are physically separated so as to allow catalyst to pass but to prevent the passage of gas, for example direct passage of gas from A1 to A2.

The skilled person will select the most suitable means to carry out this function. In the implementation shown in FIG. 1, a plate (29) is positioned between zones A1 and A2 over the whole cross section of regeneration vessel E, with the exception of sections reserved for the passage of catalyst (shafts or other conduits). Of course, a little gas will pass into zone A2 with the catalyst in the shafts, but it is only a minor portion of the gas.

After passage into the second combustion zone, the gas is extracted from the zone via conduit (5).

This separate management of gas in each combustion zone means that the incoming and outgoing gas temperatures are known at any time along with their oxygen contents. In addition to maximum oxygen use, this management enables coke combustion to be controlled by controlling the operating conditions in each zone.

Let us now turn to the combustion completion monitoring and control operation in a final zone of the combustion step.

In the implementation of FIG. 1, this operation is carried out in the lower portion (in the direction of catalyst flow) of the last combustion zone A2, this lower portion thus constituting a monitoring and control zone FC.

In a further implementation, not shown, monitoring and control zone FC is a zone which is not included in the last combustion zone A2.

Monitoring and control zone FC is distinguished from a combustion zone in that in zone FC, the approximate oxygen consumption is less than 10% of the incoming oxygen. The temperature there advantageously remains substantially constant (variation of 3% maximum, preferably 2% maximum) excluding measurement errors and heat losses.

An oxygen-containing gas enters zone FC via conduit (31), oxygen being supplied via conduit (34), the gas being extracted via conduit (5) after passage through zone FC via which gas which has traversed the final combustion zone A2 is also evacuated.

The skilled person will select suitable means for measuring the oxygen consumption in zone FC. As an example, the variation in the oxygen content between the inlet and outlet from zone FC can be measured from a variation in the inlet content (at the same total gas flow rate) and the variation in the content at the zone outlet. In general, if the operation of the preceding stages is correct, the oxygen consumption in zone FC must be small (less than 2–3%).

A further method is to provide means for measuring the temperature and/or oxygen content either in the outgoing gas (for example in the case where the gas leaves independently of the other gases from the combustion step) or at the wall via which the gas leaves zone FC.

Means for measuring the temperature of the catalytic bed or the catalyst entering and leaving the monitoring and control zone can also be used.

Thus a simple means for monitoring and controlling the correct operation of the combustion stages is provided, and independent management of the gases of each stage enables combustion faults to be remedied rapidly and easily by varying the temperature or the oxygen content in one or more zones.

If a comparison of oxygen contents or the gas and/or catalyst temperatures leads to variations which are beyond allowable values for the process (less than 10% for oxygen and at most 3% for the temperature) then at least one operating condition in at least one combustion zone is modified so as to correct the difference. The oxygen content and/or the temperature of the inlet gas could be modified.

The operating conditions are selected for each zone and strictly controlled in each zone (in contrast to the prior art) so as to reduce any deleterious effect of combustion on the catalyst by as much as possible.

Each stage (zone) receives at least one oxygen-containing gas at:

- a WHSV in the range 1 to 50 $h^{-1}$, preferably 10–40 $h^{-1}$, more preferably 15–35 $h^{-1}$;
- a temperature T in the range 350° C. to 600° C., preferably 400° C. to 600° C.;
- an oxygen $O_2$ content of at most 2%, preferably 0.5–1.5%;
- each zone has a volume V corresponding to a catalyst residence time of 5 min to 3 hours.

For each zone, the inlet temperature of the oxygen-containing gas and the oxygen content are such that:

- the maximum temperature at the bed outlet is less than a maximum allowable value, depending on the materials used (for example 770° C. for a low alloy steel);
- the maximum temperature elevation between the bed inlet and outlet is less than 200° C., preferably of the order of 100° C.;
- the temperature in the zone is at least 350° C., advantageously at least 400° C. and less than 600° C., preferably less than 580° C. and more preferably at most 550° C.;

the temperature in the zone is higher than the temperature in the immediately preceding zone. Thus in zone A2, the temperature T2 is higher than T1 in zone A1.

These ever higher temperatures result from transferring hot catalyst from the preceding zone, from introducing hot oxygen-containing gas and from the exothermal combustion reaction which develops, and from the increasing severity of the operating conditions.

In order to guarantee correct combustion, hotter and hotter gases are preferably introduced into the zones encountered during catalyst flow. Thus temperature T2 of the gas entering the second zone is advantageously higher than that T1 of the gas entering the first zone, and T3 is higher than T2 (T3: temperature in monitoring and control zone).

More precisely, a gas at a temperature which is at least equal to that at the end of combustion in the last combustion zone enters zone FC:

the oxygen content of the gas introduced also increases with the zone number which the catalyst enters, and the monitoring and control zone corresponds to the highest oxygen content (quantity higher than that of the gases entering the upstream zones).

After combustion, the catalyst with a low carbonized material content arrives in the oxychlorination zone (B) passing through conduits or shafts. Then it flows into calcining zone (C) and leaves the vessel via conduits (4).

FIG. 1 shows one oxychlorination zone and one calcining zone, but a plurality are possible. These zones are very advantageously axial in type.

Between the combustion and oxychlorination zones is a plate or any other zone separation means is advantageously positioned to allow the catalyst to pass but not the gases.

In contrast, gas circulates freely from the calcining zone to the oxychlorination zone. In FIG. 1, a single bed of catalyst is provided for calcining and oxychlorination. The invention can use distinct beds with circulation of gas and of catalyst.

The combustion gases are evacuated via at least one conduit (5) which opens into treatment zone (6) for eliminating impurities, for example by washing. After pressing in a drier (7) and a compressor (8), the gases are divided into two streams. The first stream is recycled via conduit (9) to combustion zone (A) with additional oxygen supplied via conduit (33) and possible re-heating, while the other stream passes via conduit (10).

A makeup of dry oxygen (drier (13) preceded by a chiller) is added to the second gas stream in conduit (10) via a conduit (11) connected to a compressor (12) which ensures a flow of air, for example, regulated by means of a valve, depending on the amount of oxygen required in the gas. An oxygen-containing gas is obtained in conduit (14). The gas is advantageously pre-heated in exchanger (15) before passing into a oven (16) (or any other heating means).

In the implementation shown in FIG. 1, a portion of this gas directly supplies the oxychlorination zone via conduit (17), while the other portion supplies the calcining zone via conduit (18). Gas is injected into the oxychlorination zone after adding a controlled quantity of steam via at least one conduit (19) and a controlled quantity of chlorinating agent via at least one conduit (20).

Conduits (17) and (18) arrive in the lower portion of each of the axial zones to produce a gas-solid counter-current. At conduit (17), at least one deflector (24) is advantageously located in the catalytic bed to distribute the gases properly. The gas is evacuated from the oxychlorination zone via conduit (21), advantageously passing into exchanger (15) before being routed into a washing zone (22). The washed gas can then be discharged into the atmosphere via conduit (23) or, more generally, evacuated from the unit.

A conduit (18) connected to conduit (14) is preferably provided to supply the oxygen-containing gas to the calcining zone. Conduit (18) is preferably located after oven (16). It can be seen that in the case of FIG. 1, the gases introduced via conduits (17) and (18) have substantially the same oxygen content.

FIG. 1 shows an optimised arrangement of the gases using the gases from the combustion zone in the calcining zone. Dry, heated air could just as easily be directly supplied to the calcining zone, i.e., without fractionating the gas re-heated in oven (16). Thus at least a portion of this gas is sent to the oxychlorination zone.

Figure 2:
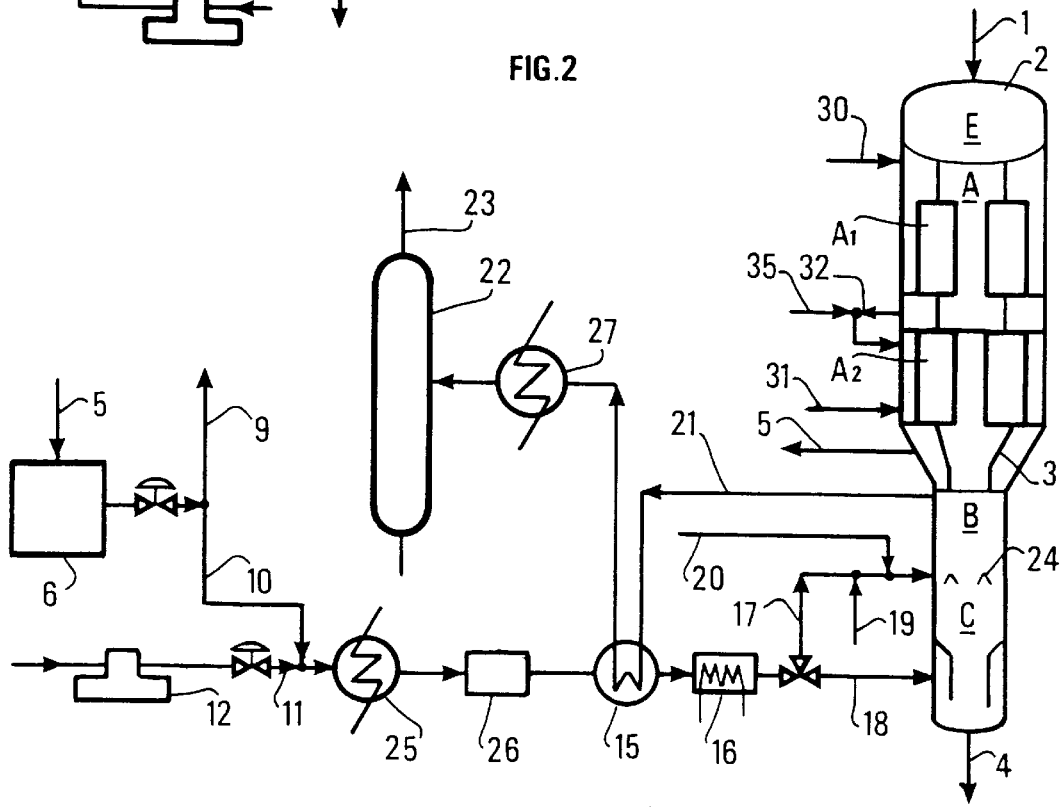

FIG. 2 shows a further implementation which is distinguished from that of FIG. 1 by the equipment placed in the conduits (driers, ovens, exchangers . . . ).

This figure is given to illustrate the possibility of varying the arrangement of equipment and conduits within the scope of the invention.

Conduit (5) for evacuating gas from the combustion step leads into a washing drum (6). After washing, the gas is fractionated into a portion which returns to the combustion zone via a conduit (9) (the equipment in this conduit is not shown). Compressed oxygen (air) (compressor (12)) supplied via conduit (11) is added to the other portion evacuated via conduit (10).

The oxygen-charged gas passes into exchanger (25), a drier (26), an exchanger (15) and an oven (16). After re-heating, the gas is divided into a stream leaving via a conduit (17) towards the oxychlorination zone with an addition of chlorinating agent via conduit (19) and water via conduit (20). The other stream goes to the calcining zone via conduit (18).

The effluent from the oxychlorination zone is evacuated via conduit (21), passes into exchanger (15), a chiller (27), and a washing drum (22), and is discharged into the atmosphere via conduit (23).

It should be noted that the embodiments shown do not include recycling of the oxychlorination gases.

The preceding examples can be repeated with similar success by substituting the generically or specifically described reactants and/or operating conditions of this invention for those used in the preceding examples.

The entire disclosure of all applications, patents and publications, cited above and below, and of corresponding French application No. 97/04.660, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

We claim:

1. A process for regenerating a moving bed of catalyst for reforming or for aromatic hydrocarbon production, the catalyst comprising a support, at least one noble metal and at least one halogen, the process comprising a combustion step of treating the catalyst in a moving bed in at least two successive combustion zones, an oxychlorination step and a calcining step, in which each combustion zone is separated from the adjacent combustion zones so as to allow catalyst to pass and to prevent the passage of gases;

at least one oxygen-containing gas is introduced into each zone of the combustion step, and the gases produced are extracted from each zone;

the severity of the operating conditions in each zone of the combustion step increases in the direction of flow of the catalyst by increasing at least one of (a) oxygen content and (b) temperature of said oxygen-containing gas;

at least one chlorinating agent, at least one oxygen-containing gas, and water are introduced into the oxychlorination step, such that an $H_2O/HCl$ molar ratio is 1 to 50, the oxychlorination step being carried out in the presence of an oxychlorination gas containing less than 21% of oxygen and at least 50 ppm by weight of chlorine, at a temperature of 350–600° C.

2. A process according to claim 1, in which at least a portion of is gas extracted from one combustion zone and sent to the following zone in the direction of catalyst flow with optional addition of oxygen.

3. A process according to claim 2, in which all of the gas extracted from one combustion zone is sent to the following zone with optional addition of oxygen.

4. A process according to claim 1, in which the combustion step ends in a last zone, termed a combustion completion control zone, in which the approximate oxygen consumption is less than 10% of the oxygen entering said zone.

5. A process according to claim 1, in which the gases from the combustion step are cooled, treated to eliminate impurities, dried, compressed then fractionated into two streams; after adding oxygen and possible re-heating, the first stream is sent to the first combustion zone, and after adding oxygen, water and chlorinating agent, and after heating, the second stream is sent to the oxychlorination step, and the gases from the oxychlorination step are treated and evacuated.

6. A process according to claim 5, comprising a combustion step of treating the catalyst in a first combustion zone then in a second combustion zone, in which the zones are separated so as to allow the catalyst to pass and to prevent the passage of gas, the second combustion zone comprising in its lower portion a zone for monitoring and controlling combustion completion, and all of the gas extracted from the first combustion zone is sent to the second combustion zone after adding oxygen, the gas from the second combustion zone is cooled, treated to eliminate impurities, purged, dried, compressed then separated into two streams; after adding oxygen, the first stream is introduced into the first combustion zone and after optional re-heating in the monitoring and control zone; the second stream is added to a re-heated dry oxygen-containing gas and sent to the oxychlorination zone after adding water and a chlorinating agent.

7. A process according to claim 6, in which the first stream is separated into two fractions, one being introduced into the first combustion zone after adding oxygen, and the other being introduced into the monitoring and control zone after adding oxygen and re-heating.

8. A process according to claim 6, in which the first stream is separated into two fractions, each having oxygen added and being re-heated before introducing one fraction into the first combustion zone and the other into the monitoring and control zone.

9. A process according to claim 4, in which the gases from the combustion step are cooled, treated to eliminate impurities, compressed, dried then fractionated into two streams; after adding oxygen and possible re-heating, the first stream is sent to the first combustion zone, and after adding oxygen, water and chlorinating agent, and after heating, the second stream is sent to the oxychlorination step, and the gases from the oxychlorination step are treated and evacuated.

10. A process according to claim 5, in which the second re-heated stream is separated into two fractions, one being sent to an oxychlorination zone after adding water and chlorinating agent, the other being sent to the calcining zone.

11. A process according to claim 7, in which the two fractions from the first stream are re-heated.

12. A process according to claim 6, in which the fraction of the first stream is re-heated before being introduced into the monitoring and control zone.

13. A process according to claim 6, in which for each combustion or monitoring and control zone, the oxygen content of the inlet gas is in the range of 0.01–2%, the temperature of the incoming gas is in the range of 350–600° C., the residence time of the catalyst in a zone is in the range of 5 minutes to 3 hours and the weight hourly space velocity is in the range of 1–50 $h^{-1}$.

14. A process according to claim 6, in which the temperature in the monitoring and control zone is substantially constant.

15. A process according to claim 1, in which the calcining step is carried out in the presence of a gas containing at most 21% of oxygen and less than 1% of water.

16. A process according to claim 1, wherein the water introduced into the oxy chlorination step amounts to over 7000 ppm by weight.

17. A process according to claim 1, wherein the water introduced into the oxy chlorination step amounts to over 8000 ppm by weight.

18. A process according to claim 1, wherein the water introduced into the oxy chlorination step amounts to over 10,000 ppm by weight.

19. A process according to claim 1, wherein the $H_2O/HCl$ molar ratio is at least 3.

20. A process according to claim 1, wherein the $H_2O/HCl$ molar ratio is at least 4.

21. A process according to claim 1, wherein the $H_2O/HCl$ molar ratio is at least 7.

22. A process according to claim 1, wherein the $H_2O/HCl$ molar ratio is 7 to 30.

23. A process according to claim 16, wherein the $H_2O/HCl$ molar ratio is 7 to 30.

24. A process according to claim 18, wherein the $H_2O/HCl$ molar ratio is 7 to 30.

* * * * *